Figure 1:
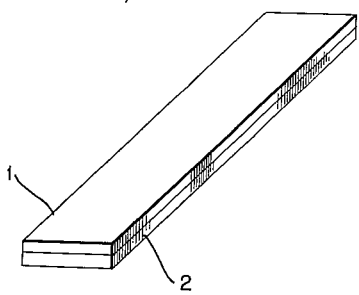

Nov. 20, 1962  P. G. LE CLERC  3,065,345
METHOD AND APPARATUS FOR THE MEASUREMENT
OF A FLUX OF NEUTRONS
Filed Aug. 31, 1959  2 Sheets-Sheet 1

INVENTOR.
PIERRE GEORGES LE CLERC
BY *Bauer and Seymour*
ATTORNEYS

Nov. 20, 1962  P. G. LE CLERC  3,065,345
METHOD AND APPARATUS FOR THE MEASUREMENT
OF A FLUX OF NEUTRONS
Filed Aug. 31, 1959

2 Sheets-Sheet 2

*INVENTOR.*
PIERRE GEORGES LE CLERC

BY *Bauer and Seymour*
ATTORNEYS

3,065,345
METHOD AND APPARATUS FOR THE MEASUREMENT OF A FLUX OF NEUTRONS
Pierre Georges Le Clerc, Paris, France, assignor to Compagnie de Saint-Gobain, Paris, France
Filed Aug. 31, 1959, Ser. No. 837,137
Claims priority, application France Sept. 5, 1958
18 Claims. (Cl. 250—83.1)

This invention relates to methods of determining the quantity of neutrons in radiation and to apparatus for making the determination.

It has been observed that the density of glasses is changed when the glass is exposed to the action of neutrons. The amount of the change in density is a function of the quantity of neutrons received by the glass. The change is appreciable, even for short exposures, whether an ordinary glass such as silica-soda-calcia is exposed to a flow of fast neutrons, or whether a glass containing elements of large cross section of absorption for the neutrons such as boron or lithium or eventually uranium and thorium is exposed to thermal neutrons. In the latter case, the irradiated elements of large cross section are capable of emitting charged particles by nuclear reaction with thermal neutrons.

For the definitions and distinctions relating to fast and thermal neutrons, see the book of S. Glasstone "Principles of Nuclear Reactions Engerineering, London (MacMillan & Co.), 1956, pages 14 and 15.

It is theoretically possible to assay the quantity of neutrons by comparing the density or the length of a piece of glass before and after irradiation. However, such a method of assay is not easy.

It is an object of the invention to measure the flow of neutrons, and to assay the quantity of neutrons received by a body submitted to irradiation.

Another object is to prepare an analyzer for neutrons and an apparatus for assaying the quantity of neutrons in radiation or which are received by a body.

Another object is to restore an analyzer to its original condition after exposure to and deformation by radiation. In this way assay apparatus can be used repeatedly by restoration of the analyzer to zero after each use.

The present invention also has as an object a neutron assay apparatus, or neutron dosimeter, of easy use and very small dimensions including a heterogeneous glass analyzer or objective which has a plurality of adjacent and preferably contiguous zones of different glasses reacting differently with or to neutrons and which undergo deformation as a result. By uniting in a single glass object two glasses whose volumes are differently changed by irradiation, one provides an analyzer of neutrons which is deformed proportionately to the quantity of neutrons received. The deformation is the greater as the quantity of neutrons received is the greater. In use, the analyzer is standardized and thereafter measures quantities, or the flow, of neutrons very simply.

In the case of the fast neutrons determination the heterogeneous glass object may be made from any two ordinary but different glasses. In the case of thermal neutrons determination, one of the glasses must include at least one element having a large cross section i.e. boron lithium, uranium, or thorium, the boron and the lithium being preferred because uranium and thorium exposed to neutrons produce undesirable and dangerous by products of fission reactions. The other glass must be free of such elements.

The glass analyzers according to the invention comprising a glass containing boron, lithium, uranium or thorium permit the determination of a flow of thermal neutrons. The glass analyzers according to the invention being made from ordinary glasses free of boron, lithium, uranium and thorium are insensible to the thermal neutrons and permit the determination of a flow of fast neutrons.

In the preferred form of the invention the heterogeneous analyzer is comprised of a double filament of glass, or a double plate of glass, the layers of which may be connected by suitable adhesive, by autogenous attachment such as by unification while soft, or even by making a single plate with different compositions on opposite sides.

Analyzers may for instance be made by drawing out side by side two molten masses of glass into parallel filaments which weld themselves together spontaneously along their lengths.

After cooling, the two ends of the bifilar object are cut down and the regular central portion is retained for use.

A double-plate type analyzer may be simply made by sticking together the two plates of different glasses by means of any suitable adhesive for the glass such as sodium silicate, solutions of artificial resins, particularly epoxy resins, etc.

The single plate type analyzers may be made from plates of glass having the compositions described in the U.S. Patents 2,106,744; 2,215,039; 2,286,275; 2,221,709, by applying to them the leaching treatments indicated in these patents, particularly in 2,106,744, page 1 col. 2, line 55, to p. 2, col. 1, line 7, or in Patent 2,215,039, page 1, col. 2, line 54, to p. 2, col. 1, line 6, so that the modification of the glass produced by the leaching be stopped at any desired depth for instance the half of the total thickness of the plate.

A single plate analyzer may also be made by adding some element in the composition of a glass plate in such manner that the modificating element penetrates only up to a predetermined depth in the plate. For instance a glass plate having the composition:

| | Percent |
|---|---|
| $SiO_2$ | 70 |
| $Al_2O_3$ | 2 |
| CaO | 10 |
| MgO | 3 |
| $Na_2O$ | 15 | is placed on the sole plate of a furnace. The superior face of the glass plate is then sprinkled with cristallised lithium nitrate powder and the furnace is heated up to 300° C. during a suitable time. The lithium ions penetrate into the glass plate by exchange with the sodium ions of the glass. The thickness of the modified layer may be varied by controlling the duration of the thermal treatment. For instance after a heating during two hours the glass is modified to a depth of about 0.25 mm.

In the course of exposure to a flow of neutrons the analyzers so constituted, whether of filament or plate type, will take a curvature which is a function of the quantity of neutrons received. Methods of measuring the curvature of objects, and instruments for such measurement, are well known.

The curvature of the filament type analyzers before and after irradiation may be determined by placing the analyzer on a series of circular gauges and noting to which gauge the analyzer will fit closely.

Also the curvature may be measured by placing the analyzer on a sheet of plotting paper and determining the value of the sagitta of the arc formed by the analyzer.

The curvature of the plate type analyzers may be determined by the same methods as those used in the case of the filament type analyzers. Before the irradiation the curvature of the plate type analyzers is zero if the plate is a plane.

In order to standardize the analyzers of the invention, several analyzers of identical constitution may be subjected to controlled and graduated quantities or flows of neutrons and the degree of curvature is noted for each exposure.

A single analyzer may be standardized by subjecting it to a series of different flows of neutrons and noting the curvature corresponding to each irradiation, the analyzer being restored to its original shape after each irradiation trial.

An analyzer may be restored to its original shape by heating it until the changes caused in the internal structure of the glass by the irradiation have been eliminated. This result may be easily obtained by placing the analyzer during about one hour in an enclosure maintained at about 400° C.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

Figure 2:
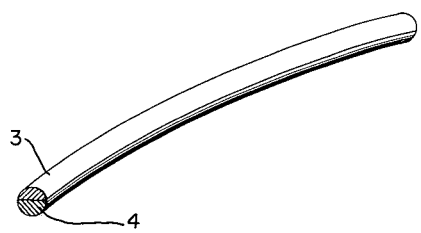
Figure 3:
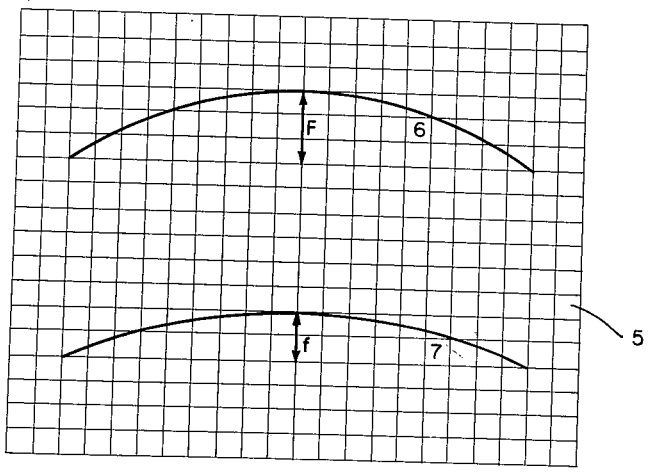
Figure 4:
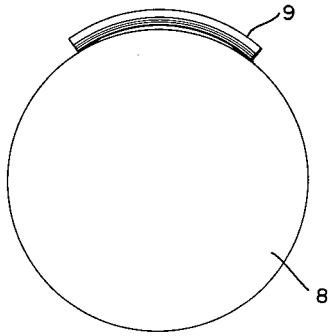
Figure 5A:
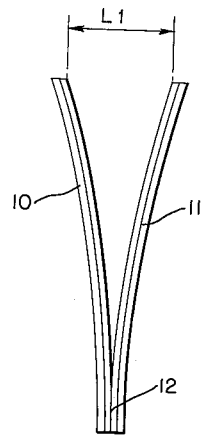
Figure 5B:
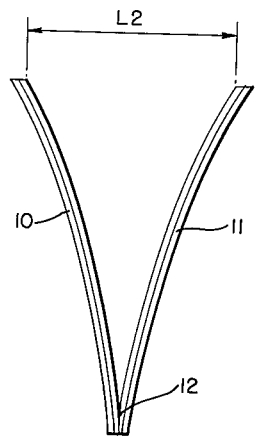
Figure 6:
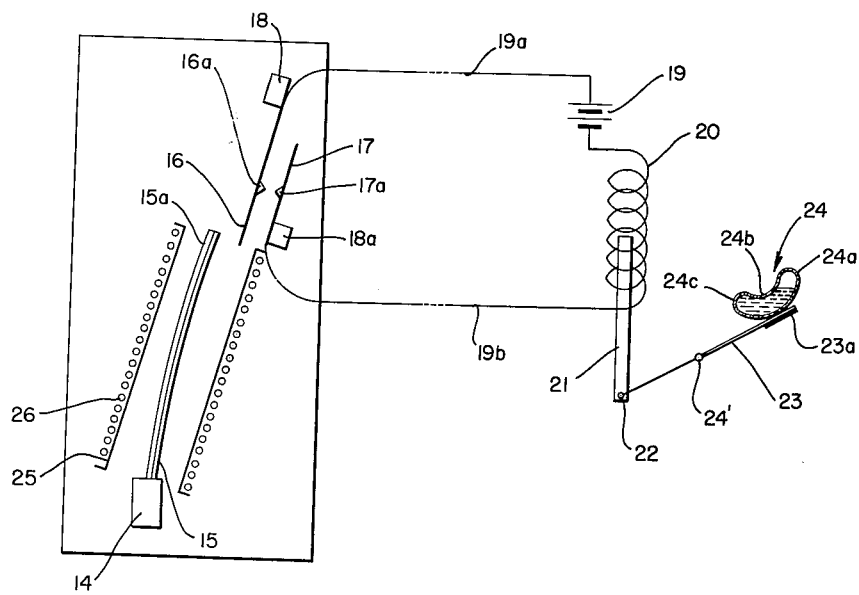

In the drawings, wherein like reference characters refer to like parts throughout the several views, FIG. 1 is a perspective view of a double-plate analyzer.
FIG. 2 is a perspective view of a bifilar-type analyzer.
FIG. 3 illustrates a first method of determining the curvature of the analyzer.
FIG. 4 illustrates a second method of determining the curvature of the analyzer.
FIG. 5 represents another method of using the analyzer.
FIG. 6 represents diagrammatically an electrical apparatus for activating an alarm and using an analyzer according to the invention.

Referring to FIG. 1, 1 is a glass plate having the composition of the first glass wand mentioned in Example 1. 2 is a glass plate having the composition of the second glass wand mentioned in Example 1. The two plates are assembled together by sticking, for instance with an epoxy-resin glue such as that sold under the trade mark "araldite" of the firm Ciba. The analyzer is a plane, before the exposure to a flow of thermal neutrons.

FIG. 2 represents a bifilar-type analyzer obtained according to the method described in Example 1. In FIG. 2, numeral 3 represents the filament of ordinary glass having the first glass composition given in Example 1, and numeral 4 represents the second filament having the second glass composition given in Example 1.

The bifilar-type analyzers present, as shown in FIG. 2, even before the exposure to neutrons, some curvature which appears on cooling owing to the difference in coefficient of expansion of the two glasses.

Referring to FIG. 3, 5 is a sheet of plotting paper on which one has marked the trace 6 of a bifilar analyzer, after exposure to neutrons. The curvature undergone by the analyzer may be readily evaluated from the sagitta $f$ in comparison to the sagitta $f$ shown by the trace 7 of the same analyzer before exposure.

FIG. 4 illustrates another method for the determination of the curvature of an analyzer. The analyzer 9, for instance a plate-type one, is applied on the external surface of different cylindrical gauges such as 8 of known radius $r$. In the trial illustrated by the FIG. 4, the radius $r$ of the gauge is greater than the radius of curvature of the analyzer. After some successive trials with smaller gauges the operator finds easily the gauge on which the analyzer fits closely and thus its exact curvature.

FIG. $5_A$ and $5_B$ illustrate another method of using the analyzers of the invention.

On FIG. $5_A$ numerals 10 and 11 represent two similar analyzers of the bifilar-type which have been welded together in the region 12 with care that the two analyzers remain in the same plane. After exposure to neutrons the two analyzers present a more accentuated curvature as shown in FIG. $5_B$ and the effect of the neutrons may be readily appreciated by the ratio L2/L1 of the distance between the free ends of the analyzers after and before exposure respectively.

This method is preferred because it permits the substitution of measures of length for measures of curvature.

In FIG. 6 is diagrammatically illustrated an apparatus for activating an alarm by means of an analyzer according to the invention. The apparatus comprises an enclosure 13 exposed to a flow of neutrons. An analyzer 15 for instance a double-plate-type analyzer fixedly supported in the enclosure by means of a piece 14 has its end 15a situated in the vicinity of a resilient blade 16 secured by means of a plug 18 and supporting a contact 16a. A second blade 17 secured on a plug 18a has a contact piece 17a. Plugs 18 and 18a are connected by conductors 19a and 19b to a generator of direct current 19, a magnet coil 20 being interposed in the circuit. A soft iron rod 21 movable along the axis of the coil 20, is connected at 22 to a swinging arm 23 articulated at 24. The free end 23a of the arm carries a mercury-switch 24 having terminals 24a, 24b, and 24c.

Surrounding the analyzer 15 is a tube 25 on which is wound a heating coil 26 connected to some generator not shown.

The working of the apparatus is as follows. Under the action of neutrons the analyzer 15 is more and more bent, so that, for a predetermined quantity of neutrons received, the free end 15a of the analyzer will sufficiently bend the blade 16, to cause the contact 16a—17a to close. The coil 20, thus excited, causes the rod 21 to move towards the coil, swinging the arm 23 and activating the mercury switch 24, which activates an alarm such as a bell, a lamp etc. not shown.

For restoring the apparatus to its initial state the tube 25 is electrically heated by means of the coil 26 and the analyzer plate 15 recovers its initial shape.

A few examples illustrate how the invention may be worked out. In these examples the dose of neutrons is expressed in nvt units. Nvt is a unit commonly used in the U.S.A. in which $n$ is the number of neutrons per the volume unit, $v$ is the velocity of the neutrons in cm. per second and $t$ is the time in seconds.

*Example 1*

Two glass wands are softened in a flame. One wand had the formula $SiO_2$, 70.8%; $Al_2O_3$, 1.7%; CaO, 9.8%; MgO, 3%; $Na_2O$, 13.5%; $B_2O_3$, 0.6% and BaO 0.6%. The other wand had the formula $SiO_2$, 60%; $Na_2O$, 10% and $B_2O_3$, 30%.

The hot ends of the wands were brought together and the glass was drawn so as to produce two strands contiguous and welded together throughout their lengths. After cooling the analyzer had some curvature because of the difference in coefficient of expansion of the glasses. This curvature is the zero of the analyzer. An analyzer of this type 8 mm. long and having a zero curvature of 0.138 cm.$^{-1}$ was exposed in an atomic pile to a dose of neutrons of $10^{18}$ nvt. After the exposure the curvature was 0.102 cm.$^{-1}$. By returning the analyzer to its zero one measures a dose of neutrons of $10^{18}$ nvt by observing on a scale the point where the curvature becomes 0.102 cm.$^{-1}$. In this particular case the modification of the curvature corresponds to a variation of the sagitta of 3.5 mm.

*Example 2*

High boron glass having the formula $SiO_2$, 60%; $B_2O_3$, 30% and $Na_2O$, 10% is made into plates 50 x 12 x 1 mm. One face of each plate is coated with a varnish and the other face is treated with $H_2SO_4$ until boron has been eliminated to a depth of ½ mm., making the composition of that half-thickness $SiO_2$, 93%; $B_2O_3$, 6.5%; $Na_2O$, 0.5%.

One of these plates was exposed to a flow of neutrons in an atomic pile. The curves obtained as a function of doses of neutrons was as follows:

| | | |
|---|---|---|
| 0 nvt | 0.020 cm.$^{-1}$ | Zero point. |
| 8.8×10$^{16}$ nvt | 0.028 cm.$^{-1}$ | |
| >1.6×10$^{17}$ nvt | 0.036 cm.$^{-1}$ | |
| 1.2×10$^{18}$ nvt | 0.150 cm.$^{-1}$ | |

The curvature of a plate having these dimensions can be measured with an error less than 0.001 cm.$^{-1}$. Thus the accuracy, and the absolute error, of measurement of neutron quantity is of the order of $1.10^{16}$ $avt.$ which is quite satisfactory in practice.

One of the advantages of these glass analyzers is their small size. They may be introduced easily into different parts of a reactor. They do not sensibly affect the flow of neutrons in their vicinity. They may be put in contact with an irradiated object to determine the quantity of neutrons which it has received. They measure the integrated flow directly without requiring the measurement of instantaneous flows.

As many apparently widely different embodiments of the present invention may be made without departing from the spirit and scope thereof, it is to be understood that the invention is not limited to the specific embodiments.

What is claimed is:

1. A method of determining the quantity of neutrons in radiation that comprises irradiating a glass body having contiguous parallel strata which have different response to neutron radiation by density change for a predetermined time, and measuring the change of said body in curvature.

2. A method of determining the quantity of neutrons in a stream that comprises passing the neutrons through a deformable glass body having a plurality of glass strata which have different density response to neutrons, and measuring the resulting deformation of the body.

3. A method of determining the quantity of neutrons passing through an area that comprises inserting in said area a glass body having differential density response to neutron radiation and, hence, which possesses the property of deforming under irradiation by neutrons, irradiating the glass body for a predetermined period of time, and measuring the amount of deformation which the glass body has undergone in that period.

4. An instrument for neutron assay having an analyzer comprised of a plurality of glass compositions the surfaces of which are tightly adhered one to the other, one of said compositions having a different density change in response to neutron-containing radiation than the other.

5. An analyzer for neutrons comprised of a glass body having a plurality of glass parts with different density response to neutrons and having the adjacent surfaces of said glass parts tightly adhered to each other.

6. An analyzer for neutrons comprised of a glass body having a plurality of glass parts with different density response to neutrons, and means to measure the deformation of the body under irradiation.

7. An analyzer for neutrons comprised of a glass body having a plurality of glass parts with different density response to neutrons, and means to measure the dimensional response of the body to irradiation.

8. A neutron analyzer having a plurality of contiguous glass strata joined together throughout their broad extent and of which one has a composition materially different from the other in its density response to radiation.

9. A neutron analyzer having a plurality of glass strands tightly adhered throughout their lengths, of which one has a materially different density change and extension under the impact of neutrons than does the other.

10. A neutron analyzer having a plurality of glass laminations tightly adhered together of which one has a materially different density change and extension under the impact of neutrons than does the other.

11. A method of restoring glass, which has been deformed by density change by neutron bombardment to its original form that comprises heating the distorted glass until it resumes its form.

12. A thermal neutrons analyzer according to claim 8 in which one of the strata is made from a glass having a high content of an element from the group formed by boron and lithium.

13. An instrument for neutrons assay having an analyzer comprised of a plurality of glass compositions having their surface areas tightly adhered together and held in fixed relation one to the other, one of said compositions comprising an element of large cross section of absorption for neutrons.

14. An instrument for neutrons assay having an analyzer comprised of a plurality of glass compositions having their surface areas tightly adhered together and held in fixed relation one to the other, one of said compositions comprising an element from the group formed by boron, lithium, uranium and thorium.

15. A neutron analyzer having a plurality of glass laminations tightly adhered together of which one has a materially different density change and extension under the impact of neutrons than does the other, and means to measure the dimensional response of said glass laminations to irradiation.

16. A neutron analyzer as set forth in claim 15 comprising means to restore said glass laminations to their original shape.

17. A neutron analyzer as set forth in claim 16 wherein said restoring means comprises a heating means operatively positioned adjacent said glass laminations, and means to selectively supply heat to said heating means.

18. A neutron analyzer as set forth in claim 17 wherein said heating means is an electric coil surrounding said glass laminations.

References Cited in the file of this patent

UNITED STATES PATENTS

| | | |
|---|---|---|
| 2,677,772 | Moon | May 4, 1954 |
| 2,714,668 | Zinn | Aug. 2, 1955 |
| 2,745,284 | Fitzgerald et al. | May 15, 1956 |
| 2,747,105 | Fitzgerald et al. | May 22, 1956 |
| 2,800,589 | Levy | July 23, 1957 |
| 2,811,649 | Atkins et al. | Oct. 29, 1957 |

Notice of Adverse Decision in Interference

In Interference No. 93,418 involving Patent No. 3,065,345, P. G. Le Clerc, METHOD AND APPARATUS FOR THE MEASUREMENT OF A FLUX OF NEUTRONS, final judgment adverse to the patentee was rendered Jan. 18, 1965, as to claims 3, 5, 6, 7 and 11.

[*Official Gazette May 18, 1965.*]

Disclaimer 3,065,345.—*Pierre Georges Le Clerc*, Paris, France. METHOD AND APPARATUS FOR THE MEASUREMENT OF A FLUX OF NEUTRONS. Patent dated Nov. 20, 1962. Disclaimer filed Aug. 27, 1965, by the assignee, *Compagnie de Saint-Gobain*.

Hereby enters this disclaimer to claims 3, 5, 6, 7 and 11 of said patent.
[*Official Gazette October 26, 1965.*]